US009132449B2

(12) United States Patent
Michel et al.

(10) Patent No.: US 9,132,449 B2
(45) Date of Patent: Sep. 15, 2015

(54) COATING SYSTEM

(75) Inventors: Philippe Michel, Le Temple de Bretagne (FR); Jean-Michel Sauton, Bouaye (FR); Karine Le Claire, Haute Goulaine (FR)

(73) Assignee: Valspar Sourcing, Inc., Minneapolis, MN (US)

( * ) Notice: Subject to any disclaimer, the term of this patent is extended or adjusted under 35 U.S.C. 154(b) by 469 days.

(21) Appl. No.: 12/597,986

(22) PCT Filed: May 1, 2008

(86) PCT No.: PCT/US2008/062244
§ 371 (c)(1),
(2), (4) Date: Feb. 4, 2010

(87) PCT Pub. No.: WO2008/137562
PCT Pub. Date: Nov. 13, 2008

(65) Prior Publication Data

US 2012/0276315 A1 Nov. 1, 2012

(51) Int. Cl.

| | |
|---|---|
| ***B32B 1/02*** | (2006.01) |
| ***B05D 7/14*** | (2006.01) |
| ***B05D 7/00*** | (2006.01) |
| *B05D 7/22* | (2006.01) |

(52) U.S. Cl.
CPC *B05D 7/14* (2013.01); *B05D 7/546* (2013.01); *B05D 7/227* (2013.01); *B05D 2520/10* (2013.01); *B05D 2701/00* (2013.01); *Y10T 428/1359* (2015.01); *Y10T 428/31935* (2015.04)

(58) Field of Classification Search
CPC ........ B05D 7/14; B05D 7/277; B05D 7/1456; B05D 2520/10; B05D 2701/00; B05D 7/546; Y10T 428/1359; Y10T 428/1355; Y10T 428/31935; B32B 1/02
USPC ................ 428/35.9, 35.8, 35.7, 522; 427/388
See application file for complete search history.

(56) References Cited

U.S. PATENT DOCUMENTS

| | | | | |
|---|---|---|---|---|
| 3,593,848 | A | 7/1971 | Landau | |
| 4,278,728 | A | 7/1981 | Honda et al. | |
| 4,692,382 | A | 9/1987 | Scmitt et al. | |
| 5,013,589 | A | 5/1991 | Schafer et al. | |
| 5,223,025 | A | 6/1993 | Seibel | |
| 5,278,223 | A * | 1/1994 | Gruenewaelder et al. | 524/502 |
| 5,384,169 | A | 1/1995 | Waschinski et al. | |
| 5,776,569 | A | 7/1998 | Cole | |
| 6,916,874 | B2 | 7/2005 | Mazza et al. | |
| 6,924,328 | B2 | 8/2005 | Legleiter et al. | |
| 2007/0036903 | A1 | 2/2007 | Mayr et al. | |

OTHER PUBLICATIONS

International Search Report and Written Opinion for PCT/US2008/062244 dated Aug. 18, 2008 (8 pages).
International Preliminary Report on Patentability for PCT/US2008/062244 dated Nov. 3, 2009 (6 pages).

* cited by examiner

*Primary Examiner* — Erik Kashnikow

(57) ABSTRACT

A coating system is provided that includes an undercoat composition that includes a thermoplastic dispersion. In certain preferred embodiments, the coating system is a multi-coat system that includes the undercoat composition and an overcoat composition that includes a thermoplastic dispersion. In one embodiment, the coating system is suitable for use on a food-contact surface of a food or beverage container.

19 Claims, No Drawings

COATING SYSTEM

CROSS REFERENCE TO RELATED APPLICATION

This application is the National Stage filing under 35 U.S.C. 371 of International Application No. PCT/US2008/062244 filed May 1, 2008, which claims the benefit of U.S. Provisional Application No. 60/915,582 filed on May 2, 2007, both of which are incorporated herein by reference in their entirety.

TECHNICAL FIELD

This invention relates to coating compositions and processes for making coating compositions. More specifically, this invention relates to coating compositions suitable for use in coating containers.

BACKGROUND

Conventional container coatings may be derived from a thermally curable formulation that includes particles of a thermoplastic material (typically vinyl chloride polymers such as, for example, poly(vinyl chloride) ("PVC")) in an organic solvent. When these coatings are applied to a substrate and cured, the thermoplastic material can degrade and discolor. Degradation products such as, for example, hydrochloric acid ("HCl") can attack the substrate. To stabilize thermoplastic materials such as PVC and reduce degradation, epoxy resins may be added to the coating formulation. These epoxy resins typically include polyglycidyl ethers of aromatic polyols such as bisphenol A (often referred to as "BADGE"). Epoxy novolacs and epoxidized linseed oil have also been used as a stabilizer for coating formulations containing thermoplastic materials such as PVC.

Such conventional epoxy-containing coating formulations may include small amounts of (i) unreacted bisphenol A ("BPA") or BADGE and (ii) low-molecular-weight components containing BPA or BADGE which, in the food packaging industry, can potentially migrate into packaged foodstuffs over time. In addition, conventional coating systems for use in packaging applications that require exposure to aggressive or corrosive food or beverage products often employ a BPA- or BADGE-containing epoxy-phenolic size coat in combination with a topcoat formulation containing thermoplastic materials such as PVC. Although the balance of scientific evidence available to date does not indicate clearly that traces of the aforementioned compounds that might be released from existing coatings pose health risks to humans, these compounds are perceived by some people as being potentially harmful to human health. Consequently, there is a desire to reduce or eliminate these compounds from food-contact coatings. However, it has been problematic to formulate thermoplastic coating formulations that exhibit very low or non-detectable levels of mobile forms of these compounds while still retaining the required coating characteristics (e.g., flexibility, adhesion, corrosion resistance, stability, etc.).

Thus, there is a continuing need for improved coating compositions.

SUMMARY

In one aspect, the invention provides a multi-coat coating system. In some embodiments, the multi-coat coating system may include (i) an undercoat composition, (ii) an overcoat composition, (iii) multiple coats of the undercoat composition, (iv) multiple coats of the overcoat composition, or (v) a combination thereof. Preferably, the multi-coat system includes at least one layer of the undercoat composition and at least one layer of the overcoat composition. The undercoat composition preferably includes a thermoplastic polymer such as, for example, PVC dispersed in a carrier liquid. In some embodiments, the undercoat composition may further include one or more of a stabilizer, a polyester, or a crosslinker. The overcoat composition preferably includes a thermoplastic material such as, for example, PVC dispersed in a carrier liquid. In some embodiments, the overcoat composition may further include one or more of a stabilizer, a polyester, or a crosslinker. The multi-coat coating system is preferably substantially free of mobile bisphenol A ("BPA") and oxirane-containing compounds (e.g., BADGE, BFDGE, and epoxy novalacs) and, more preferably, substantially free of bound BPA and oxirane-containing compounds.

In yet another aspect, the invention provides a coating system consisting essentially of a layer including a composition comprising a thermoplastic polymer dispersed in a carrier liquid. Preferably, the coating system is free of an epoxy-phenolic coat directly overlying or underlying the layer. Preferably, the coating system is substantially free of mobile BPA and oxirane-containing compounds and, more preferably, substantially free of bound BPA and oxirane-containing compounds. In some embodiments, the coating system is a mono-coat coating system.

In yet another aspect, the invention provides a coated article having a coating system applied to at least a portion of a metal substrate of the article. In one embodiment, the coating system of the coated article is a multi-coat coating system that preferably includes the undercoat composition and the overcoat composition. In another embodiment, the coating system of the coated article is a mono-coat coating system that preferably includes either the overcoat composition or the undercoat composition.

In yet another aspect, the invention provides a method for coating at least a portion of a metal substrate of an article. In one embodiment, the method includes: (a) applying an undercoat composition to the metal substrate which includes a thermoplastic polymer; (b) drying and at least partially curing the undercoat composition; (c) applying an overcoat composition to the coated metal substrate that includes a thermoplastic polymer dispersed in an overcoat carrier; and (d) curing the overcoat composition to produce a cured coating system adhered to the metal substrate. In one such embodiment of the method, the undercoat composition contains a PVC polymer dispersed in an undercoat carrier liquid, a stabilizer, and a crosslinker.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and the claims.

DEFINITIONS

Unless otherwise specified, the following terms as used herein have the meanings provided below.

The term "substantially free" of a particular mobile compound means that the compositions of the present invention contain less than 100 parts per million (ppm) of the recited mobile compound.

The term "essentially free" of a particular mobile compound means that the compositions of the present invention contain less than 10 parts per million (ppm) of the recited mobile compound.

The term "essentially completely free" of a particular mobile compound means that the compositions of the present invention contains less than 1 part per million (ppm) of the recited mobile compound.

The term "completely free" of a particular mobile compound means that the compositions of the present invention contain less than 20 parts per billion (ppb) of the recited mobile compound.

If the aforementioned phrases are used without the term "mobile" (e.g., "substantially free of BPA compound") then the compositions of the present invention contain less than the aforementioned amount of the compound whether the compound is mobile in the coating or bound to a constituent of the coating.

The term "mobile" means that the compound can be extracted from the cured coating when a coating (typically ~1 $mg/cm^2$ (6.5 $mg/in^2$) thick) is exposed to a 10 weight percent ethanol solution for 2 hours at 121° C. followed by exposure for 10 days in the solution at 49° C.

The term "food-contact surface" refers to a surface of an article (e.g., a food or beverage container) that is in contact with, or suitable for contact with, a food or beverage product.

The term "closure compound" refers to a material applied to a topcoat of an interior surface of a closure (e.g., twist off lids or caps) for purposes of sealing the closure to a container. The term includes, for example, PVC-containing closure compounds (including, e.g., plastisols) for sealing closures to food or beverage containers.

Unless otherwise indicated, a reference to a "(meth)acrylate" compound (where "meth" is bracketed) is meant to include both acrylate and methacrylate compounds.

The term "organosol" refers to a dispersion of thermoplastic particles in a liquid carrier that includes an organic solvent or a combination of an organic solvent and a plasticizer.

The term "plastisol" refers to a dispersion of thermoplastic particles in a plasticizer.

The term "overcoat composition" is defined as the coating composition to be applied to an undercoat composition or to one or more intermediate layers applied to an undercoat composition. The term includes topcoats.

The term "multi-coat coating system" refers to a coating system that includes at least two layers. In contrast, a "monocoat coating system" as used herein refers to a coating system that includes only a single layer.

The term "crosslinker" refers to a molecule capable of forming a covalent linkage between polymers or between two different regions of the same polymer.

The term "polymer" includes both homopolymers and copolymers (i.e., polymers of two or more different monomers).

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" amine can be interpreted to mean that the coating composition includes "one or more" amines.

Also herein, the recitations of numerical ranges by endpoints include all numbers subsumed within that range (e.g., 1 to 5 includes 1, 1.5, 2, 2.75, 3, 3.80, 4, 5, etc. and at least 1 include 1, 1.5, 2, 17, etc.).

DETAILED DESCRIPTION

Preferred coating systems of the present invention include an undercoat composition that preferably includes a dispersion of a thermoplastic material in a liquid carrier. The undercoat composition is preferably suitable for use as an adherent base coat of a multi-coat coating system applied to a substrate. In addition to the undercoat composition, preferred coating systems of the present invention also include an overcoat composition, which preferably includes a dispersion of a thermoplastic material in a liquid carrier. In preferred embodiments, at least one (and preferably both) of the undercoat and overcoat compositions is an organosol, and more preferably a vinyl organosol.

Preferred coating systems of the present invention are suitable for use with a variety of substrates upon which it may be desirable to employ a cured coating system having one or more of the following properties: good application to a substrate, good corrosion resistance (e.g., good resistance to corrosion mediated by food or beverage products having aggressive or corrosive chemical properties), good adhesion to an underlying substrate (e.g., a metal substrate), good flexibility, good fabrication properties, and good adhesion to closure compounds. In addition to the above coating properties, preferred coating systems of the invention exhibit excellent stability over an extended period of time (e.g., weeks, months, etc.) when in an uncured liquid state prior to application to a substrate. Upon application and curing on a substrate, preferred cured coating systems of the invention exhibit excellent stability over an extended period of time (e.g., months, years, etc.).

Cured coating systems of the present invention may be useful for coating a wide assortment of packaging articles. Presently preferred cured coating systems are particularly well suited for use on metal closures.

The coating systems are particularly suited for use on food-contact surfaces, including food-contact surfaces that require a cured coating that exhibits good resistance to corrosion or degradation when exposed for an extended period of time to a food or beverage product having an aggressive or corrosive chemical property. Examples of such food or beverage products may include certain acid-based food or beverages, milk-based products, meat-based products, onions, sauerkraut, fish in sauce, marinades, mussels, fruits in sweet sauces, energy drinks, coffee drinks, soups, mustard, mayonnaise, ketchup, salad dressings, etc.

As previously discussed, to achieve good adhesion and corrosion resistance, conventional coating systems often utilize an epoxy-phenolic size coat applied to the substrate in combination with an organosol topcoat. The epoxy-phenolic size coat of such coating systems (as well as the organosol topcoat) typically includes BPA, BADGE, or other oxirane-containing compounds, which may be undesirable for the reasons previously discussed. Such coating systems are frequently employed, for example, on interior surfaces of metal closures for food and beverage containers. Preferred coating systems of the present invention, however, exhibit good adhesion and corrosion resistance without employing an epoxy-phenolic size coat. Surprisingly, such preferred coating systems exhibit suitable adhesion and corrosion resistance when utilizing an undercoat containing a thermoplastic dispersion and, more preferably, a vinyl organosol—thereby avoiding the need for an epoxy-phenolic size coat.

While not presently preferred, coating compositions of the present invention may include BPA, BPF, BADGE, aromatic glycidyl ethers, or other oxirane-containing compounds, especially if such compounds are of a non-mobile form.

In preferred embodiments, at least one (and more preferably both) of the undercoat and overcoat compositions is substantially free of more preferably essentially free of, even more preferably essentially completely free of, and most preferably completely free of one or more of the following compounds A-D:

(A) mobile BPA and aromatic glycidyl ether compounds (e.g., BADGE, diglycidyl ethers of BPF (BFDGE) and epoxy novalacs);

(B) mobile and bound BPA and aromatic glycidyl ether compounds (e.g., BADGE, BFDGE and epoxy novalacs);

(C) mobile oxirane-containing compounds (e.g., BADGE, BFDGE, epoxy novolacs, and epoxidized oils); and (D) mobile and bound oxirane-containing compounds (e.g., BADGE, BFDGE, epoxy novolacs, and epoxidized oils).

In some embodiments, coating compositions of the present invention are preferably substantially free of, more preferably essentially free of, even more preferably essentially completely free of, and optimally completely free of two or more, three or more, or all of the above compounds A-D. In presently preferred embodiments, the coating system is completely free of the above compounds B, and more preferably completely free of the above compounds B and D.

Preferably, the undercoat composition, and more preferably both the undercoat and the overcoat compositions, includes at least one thermoplastic material, which is preferably dispersed in a liquid carrier to form a thermoplastic dispersion. Examples of suitable thermoplastic materials include halogenated polyolefins, which include, for example, copolymers and homopolymers of vinyl chloride, vinylidenefluoride, polychloroprene, polychloroisoprene, polychlorobutylene, and combinations thereof. PVC is a particularly preferred thermoplastic material.

The thermoplastic material is typically in the form of finely divided powder or particles. Dispersion-grade thermoplastic particles are preferred, where the average particle size of the particles preferably is from about 0.1 to about 30 microns, and more preferably about 0.5 to about 5 microns. Other particle sizes, however, can be used such as, for example, non-dispersion-grade thermoplastic particles having an average particle size outside the above sizes. In some embodiments, PVC in the form of a soluble copolymer may be included in addition to dispersion grade thermoplastic materials. The VMCC UCAR product (available from DOW Chemical Company) is an example of a suitable solution vinyl.

Preferred PVC polymer powders exhibit no more than minimal swelling (and preferably substantially no swelling) when dispersed in a suitable liquid carrier, especially an organic solvent liquid carrier. The PVC powder employed may be of any suitable molecular weight to achieve the desired result. Preferred PVC powders have a number average molecular weight ($M_n$) of at least about 50,000, more preferably at least about 75,000, and even more preferably at least about 100,000. Preferred PVC powders exhibit an $M_n$ of less than about 300,000, preferably less than about 200,000, and even more preferably less than about 150,000.

Suitable commercially available PVC polymer powders for use in the present coating system include, for example, those sold under the GEON trade name (e.g., the GEON 171 and 178 products available from Polyone Corp., Pasadena, Tex.) and those sold under the VINNOL trade name (e.g., the VINNOL P70 product available from Wacker Chemie, Munich, Germany). GEON 171 and GEON 178 PVC powder are presently preferred.

Preferred undercoat and/or overcoat compositions include at least about 10, more preferably at least about 25, and even more preferably at least about 30 wt-% of thermoplastic material, based on the total nonvolatile weight of the respective undercoat or overcoat composition. Preferably, the undercoat and/or overcoat compositions include less than about 60, more preferably less than about 55, and even more preferably less than about 50 weight percent ("wt-%") of thermoplastic material, based on the total nonvolatile weight of the respective undercoat or overcoat composition. While not intending to be bound by any theory, in some embodiments, the incorporation of a suitable amount of thermoplastic material (and particularly PVC) into the overcoat composition is believed to be important in achieving good compatibility and adhesion between a closure compound and the overcoat composition.

As previously mentioned, the thermoplastic material is preferably dispersed in a liquid carrier to form a thermoplastic dispersion. In preferred embodiments, the undercoat and/or overcoat compositions of the present invention are organosols or plastisols, more preferably organosols, and even more preferably vinyl organosols. A "vinyl organosol," as used herein, is a dispersion of vinyl chloride polymers (preferably high-molecular-weight vinyl chloride polymers) in a liquid carrier that includes an organic solvent or a combination of an organic solvent and a plasticizer.

The carrier liquid is typically at least substantially non-aqueous. While not preferred, in some embodiments a relatively low amount of water may be included so long as the coating composition is not unsuitably affected. Examples of suitable liquid carriers include an organic solvent, a plasticizer, or mixtures thereof. Suitable organic solvents include, for example, aliphatic hydrocarbons, like mineral spirits, kerosene, and high flash VM&P naphtha; aromatic hydrocarbons, like toluene, benzene, xylene and blends thereof (e.g., the Aromatic Solvent 100 product); alcohols, like isopropyl alcohol, n-butyl alcohol, and ethyl alcohol; ketones, like cyclohexanone, ethyl aryl ketones, methyl aryl ketones, and methyl isoamyl ketone; esters, like alkyl acetates (e.g. ethyl acetate and butyl acetate); glycol ethers like ethylene glycol monomethyl ether, ethylene glycol monoethyl ether, ethylene glycol monobutyl ether (e.g. glycol ether EB), and propylene glycol monomethyl ether; glycol ether esters, like propylene glycol monomethyl ether acetate; aprotic solvents, like tetrahydrofuran; chlorinated solvents; mixtures of these solvents and the like. Preferred liquid carriers have sufficient volatility to evaporate substantially from the coating system during the curing process.

Examples of suitable plasticizers include phosphates, adipates, sebacates, epoxidized oils (not preferred, but may be used in certain embodiments if desired), polyesters, and combinations thereof.

As discussed above, thermoplastic materials are typically susceptible to degradation. The undercoat and/or overcoat composition preferably includes at least one component to stabilize thermoplastic dispersions included therein. Such components are referred to herein as “stabilizers.” The undercoat and/or overcoat composition can include any type of stabilizer. While not intending to be bound by any theory, certain preferred stabilizers are believed to stabilize compositions containing dispersed thermoplastic materials such as PVC by, for example, (i) preventing degradation (e.g., through inhibiting formation of degradation products such as HCl), and/or (ii) scavenging degradation products such as HCl. In certain embodiments, the undercoat and/or overcoat compositions preferably include one or more stabilizers preferably capable of stabilizing (i) the liquid thermoplastic dispersion prior to coating application, (ii) the thermoplastic dispersion during the curing process, and/or (iii) the cured coating composition. In a preferred embodiment, both the overcoat and undercoat composition contain a stabilizer (or a combination of stabilizers) capable of achieving all of the above (i), (ii) and (iii).

Examples of suitable stabilizers include organotin esters such as dibutyl tin dilaurate; organotin maleates, especially dibutyl tin maleate; mono- and di-octyl tin mercaptides (e.g. TINSTAB OTS 17 MS product available from AKZO-Nobel Chemicals, Inc., Chicago, Ill.); barium, cadmium, and strontium metal soaps; calcium ion exchanged amorphous silica gel; calcium borosilicate; calcium phosphosilicate; strontium zinc phosphosilicate; magnesium zirconium salt; zinc aluminum polyphosphate hydrate; zinc aluminum strontium orthophosphate; polyphosphate silicate hydrate; hydrotalcite (e.g., the HYCITE 713 product available from Ciba Specialty Chemicals, Inc., Basel, Switzerland); hydrated zinc and aluminum polyphosphate; zinc aluminum polyphosphate; zinc phosphate; organic di-acid; zinc molybadate compound; zinc phospho molybadate; calcium zinc molybdate; calcium molybadate propylene oxide; oxirane-functional stabilizers such as epoxidized oils (e.g., epoxidized linseed oil, epoxidized soybean oil, etc.), epoxy novolacs, adducts of dimer acids of diglycidyl ether (DGE), aromatic and aliphatic epoxy resins, epoxidized polybutadienes, epoxy-functionalized stabilizers including a monomeric unit derived from a glycidyl ester of an $\alpha,\beta$-unsaturated acid or anhydride thereof (see U.S. Pat. No. 6,916,874), and any of the oxirane-functional stabilizers taught in U.S. Pat. No. 6,924,328; (meth)acrylic (co)polymers; polyester polymers such as, for example, acrylated polyesters, BADGE-containing polyesters, fatty-acid modified polyesters, acrylated fatty-acid-modified polyesters (see U.S. Provisional Application No. 60/909,621 entitled “Stabilizer Polymer and Coating Compositions Thereof” by Payot et. al. filed on Apr. 2, 2007); and mixtures, copolymers, or derivatives thereof.

Preferred stabilizers are free of BPA and oxirane-containing compounds. While not preferred, stabilizers containing BPA, BADGE, and/or other oxirane-containing compounds may be used, if desired.

In presently preferred embodiments, the undercoat and/or overcoat composition include at least one polymer stabilizer, and more preferably a polyester polymer stabilizer.

The undercoat and/or overcoat compositions may include any suitable amount of one or more stabilizer to achieve the desired result. The amount included may vary depending upon a variety of factors including, for example, the type or types of stabilizers employed, as well as the desired effect. In preferred embodiments, the undercoat and/or overcoat composition include at least about 0.1, more preferably at least about 5, and even more preferably at least about 15 wt-% of stabilizer, based on the total nonvolatile weight of the respective undercoat or overcoat composition. Preferably, the undercoat and/or overcoat compositions of the present invention include less than about 65, more preferably less than about 60, and even more preferably less than about 55 wt-% of stabilizer, based on the total nonvolatile weight of the respective undercoat or overcoat composition.

In preferred embodiments, at least one, and more preferably both, of the undercoat and overcoat compositions include at least one polyester polymer. While not intending to be bound by any theory, in some embodiments, the presence of one or more suitable polyester polymers in cured coating systems of the present invention is believed to contribute to one or more of: (i) good corrosion resistance, (ii) good flexibility, and/or (iii) good substrate adhesion. In addition, while not intending to be bound by any theory, it is believed that, in certain embodiments, at least some of the polyester polymer may function as a stabilizer.

The chemical composition of the polyester polymer is not especially limited. Preferred polyester polymers have at least one, and more preferably at least two functional groups capable of undergoing a chemical reaction (preferably a cross-linking reaction) with another component of the coating system. In a presently preferred embodiment, the polyester polymer is capable of forming a covalent linkage with a functional group of a crosslinker (and preferably a phenolic crosslinker). Examples of suitable functional groups for the polyester polymer include hydroxyl groups, carboxyl groups (including, e.g., precursor or derivative groups such as anhydride or ester groups), and combinations thereof. Hydroxyl and/or carboxyl groups are presently preferred.

The polyester polymer may contain one or more free hydroxyl groups in certain embodiments. In such embodiments, the hydroxyl number of the polyester polymer is preferably from about 5 to about 100 milligrams KOH/g, and more preferably from about 10 to about 50 mg KOH/g. Alternatively, the functional polyester polymer may be carboxyl-terminated. In such embodiments, the polyester polymer preferably exhibits an acid number (AN) of about 2 to about 50 mg KOH/g, and more preferably from about 5 to about 35 mg KOH/g. Acid number may be determined using the titrimetric method described in ISO Standard XP-000892989. Hydroxyl number may be determined using the same standard test method, substituting a solution of hydrochloric acid in ethanol for the potassium hydroxide in ethanol titrant, and expressing the neutralization endpoint equivalents of hydrochloric acid in terms of the molar equivalents of potassium hydroxide.

Preferred polyester polymers preferably have an $M_n$ that is (i) suitable for efficient application of the coating system to a substrate (e.g., to avoid, for example, unsuitable misting or sticking) and/or (ii) suitable to achieve good compatibility with other materials (especially thermoplastic materials such as PVC) present in the coating system. Preferred polyester polymers have an $M_n$ of preferably at least about 500, more preferably at least about 1,000, and even more preferably at least about 1,500. Preferably, the $M_n$ of the one or more polyester polymers is less than about 10,000, more preferably less than about 7,500, and even more preferably less than about 5,000.

Suitable commercially available polyester polymers include, for example, DUROFTAL VPE 6104 (available from UCB) and DYNAPOL polyester resins (e.g., DYNAPOL L 658, L 6258, LH 826 and 44826 (both available from Degussa, GMbH, Frankfurt, Germany)). DYNAPOL L658 and DUROFTAL VPE 6104 are preferred polyesters for use in overcoat compositions. DYNAPOL L826 is a preferred polyester for use in undercoat compositions. For further discussion of suitable polyester polymers, see, for example, U.S. 20070036903 by Mayr et al.

While not intending to be bound by any theory, when present, the amount of one or more polyester polymers included in undercoat compositions of the present invention is believed to contribute to the excellent corrosion resistance that has been observed for preferred cured coating systems of the present invention. In a presently preferred embodiment, the undercoat composition includes at least about 10, more preferably at least about 15, and even more preferably at least about 20 wt-% of one or more polyester polymers, based on the total nonvolatile weight of the undercoat composition. Preferably, the undercoat composition includes less than about 40, more preferably less than about 35, and even more preferably less than about 30 wt-% of one or more polyester polymers, based on the total nonvolatile weight of the undercoat composition. The above amounts include any polyester polymer(s) present in the undercoat composition, regardless of whether the polyester polymer(s) are, or are not, capable of functioning as a stabilizer. In preferred embodiments, the overcoat composition includes an amount of polyester polymer(s) pursuant to the aforementioned ranges of polyester polymer(s) included in the undercoat composition.

The undercoat and/or overcoat composition may be formulated using one or more curing agents, including, for example, one or more crosslinkers. The choice of a particular crosslinker typically depends on the particular product being formulated. For example, some coating compositions are highly colored (e.g., gold-colored coatings). These coatings may typically be formulated using crosslinkers that tend to have a yellowish color. In contrast, white coatings are generally formulated using non-yellowing crosslinkers, or only a small amount of a yellowing crosslinker.

Any suitable crosslinker can be used. For example, phenolic crosslinkers (e.g., phenoplasts), amino crosslinkers (e.g., aminoplasts), anhydride- and/or carboxylic-acid-group-containing crosslinkers, urethane-group containing crosslinkers, and combinations thereof, may be employed.

Examples of suitable phenolic crosslinkers (e.g., phenoplasts) include the reaction products of aldehydes with phenols. Formaldehyde and acetaldehyde are preferred aldehydes. Examples of suitable phenols that can be employed include phenol, cresol, p-phenylphenol, p-tert-butylphenol, p-tert-amylphenol, cyclopentylphenol, cresylic acid, BPA, and combinations thereof. Examples of suitable commercially available phenolic compounds include those known by the BAKELITE tradename (e.g., BAKELITE 6535LB, 6581LB, and 6812LB available from Bakelite A.G., Iserlohn, Germany), the DUREZ tradename (e.g., DUREZ 33162 available from Durez Corporation, Addison, Tex.), the PHENODUR tradename (e.g., PHENODUR PR 285 55/IB/B and PR 897 available from CYTEC Surface Specialties, Smyrna, Ga.), and SANTOLINK EP 560 products. Phenolic crosslinkers are presently preferred crosslinkers, with resole phenolic crosslinkers being particularly preferred since such phenolics are not derived from BPA or oxirane-containing compounds. In presently preferred embodiments, the undercoat composition contains at least one phenolic crosslinker.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, and urea-formaldehyde-based resins.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL 301, CYMEL 303, CYMEL 370, CYMEL 373, CYMEL 1131, CYMEL 1125, and CYMEL 5010 Maprenal MF 980 (all available from Cytec Industries Inc., West Patterson, N.J.); and Uramex BF 892 (available from DSM, Netherlands).

Any suitable crosslinker containing acid and/or anhydride groups can be employed. Adducts of diols such as ethyleneglycol and trimellitic anhydride are one example of such compounds. Examples of suitable commercial products include ARADUR HT 3380 (available from Huntsmann GMbH, Frankfurt, Germany) or PHENODUR VPM1150 (available from Cytec).

The concentration of crosslinker included in the coating system of the present invention may vary depending upon the desired result. In a presently preferred embodiment, (a) the undercoat composition contains a first amount of one or more undercoat crosslinkers suitable to provide a coating system that, when cured, has good corrosion resistance, while (b) the overcoat composition contains a second amount of one or more overcoat crosslinkers suitable to provide a coating system that, when cured, has good adhesion (e.g., with a closure compound). For certain embodiments, in order to achieve this balance of coating properties, the undercoat composition preferably includes a greater total amount of crosslinker than the overcoat composition. While not intending to be bound by any theory, it is believed that the presence of an excessive amount of crosslinker in the overcoat composition can unsuitably degrade adhesion between the cured coating system and, for example, a closure compound.

Preferred undercoat compositions contain at least about 0.01, more preferably at least about 1, and more preferably at least about 5 wt-% of crosslinker, by weight of nonvolatile material in the undercoat composition. Preferably, the undercoat compositions contain less than about 30, more preferably less than about 25, and even more preferably less than about 20 wt-% of crosslinker, by weight of nonvolatile material in the undercoat composition. In a presently preferred embodiment, the undercoat composition includes about 12 wt-% of crosslinker by weight of nonvolatile material.

Preferred overcoat compositions contain at least about 0.01, more preferably at least about 1, and more preferably at least about 3 wt-% of crosslinker, by weight of nonvolatile material in the overcoat composition. Preferably, the overcoat compositions contain less than about 25, more preferably less than about 20, and even more preferably less than about 15 wt-% of crosslinker, by weight of nonvolatile material in the overcoat composition. In a presently preferred embodiment, the undercoat composition includes about 6 wt-% of crosslinker by weight of nonvolatile material.

In some embodiments, a catalyst is included in the undercoat and/or overcoat compositions to increase the rate of cure. If used, a catalyst is preferably present in an amount of at least about 0.05, and more preferably at least about 0.1 wt-% of nonvolatile material. If used, a catalyst is preferably present in an amount of less than about 1, and more preferably less than about 0.5 wt-% of nonvolatile material. Examples of suitable catalysts include acid catalysts such as phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), alkyl acid phosphate (AAP), and the like, and mixtures thereof.

In some embodiments, a suitable amount of one or more optional pigments can be included in the undercoat and/or overcoat compositions. Suitable pigments, such as aluminum flake, titanium dioxide, or combinations thereof, may be added, for example, to (a) improve the appearance of the cured coating system (e.g., color, opacity, etc.) and/or (b) act as filler to increase the solid content of the coating system and/or dry film weight of the cured coating system. In preferred embodiments, both the undercoat and overcoat compositions include titanium dioxide.

Preferred undercoat and/or overcoat compositions include greater than about 0.1, more preferably greater than about 10, and even more preferably greater than about 20 wt-% of titanium dioxide, based on the total nonvolatile weight of the respective undercoat or overcoat composition. Preferred undercoat and/or overcoat compositions include less than about 60, more preferably less than about 45, and even more preferably less than about 35 wt-% of titanium dioxide, based on the total nonvolatile weight of the respective undercoat or overcoat composition.

The coating system of the invention may optionally include other additives that do not adversely affect the coating system or a cured coating system resulting therefrom. The optional additives are preferably at least substantially free of mobile BPA and oxirane-containing compounds (e.g., BADGE, BFDGE, epoxy novalac compounds, and epoxidized oils). Suitable additives include, for example, those that improve the processability or manufacturability of the composition, enhance composition aesthetics, and/or improve a particular functional property or characteristic of the coating composition or the cured composition resulting therefrom, such as adhesion to a substrate. Additives that may be included are carriers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents, or combinations thereof. Each optional ingredient may be included in a sufficient amount to serve its intended purpose, but preferably not in such an amount to adversely affect a coating composition or a cured coating composition resulting therefrom.

Preferred undercoat and/or overcoat compositions include at least about 30, more preferably at least about 35, and even more preferably at least about 40 wt-% of solids, based on the total weight of the respective undercoat or overcoat composition. Preferred undercoat and/or overcoat compositions include less than about 75, more preferably less than about 70, and even more preferably less than about 65 wt-% of solids, based on the total weight of the respective undercoat and/or overcoat composition.

The film thickness of cured coating systems of the present invention may vary depending upon a variety of factors, including, for example, the desired properties (e.g., mechanical properties, aesthetic properties, corrosion resistance, etc.) of the cured coating system, the substrate upon which the coating system is applied, the presence of substances that may contact the cured coating system (e.g., certain aggressive or corrosive products), and/or the intended use of the coated article. In presently preferred embodiments, the total dry film weight of the cured coating system is at least about 5, more preferably at least about 10, and even more preferably at least about 15 $g/m^2$ (grams per square meter). Preferably, the total dry film weight of the cured coating system is less than about 40, more preferably less than about 30, and even more preferably less than about 25 $g/m^2$.

In presently preferred embodiments, the coating system is a two-coat coating system that includes a base layer formed from the undercoat composition and a topcoat formed from the overcoat composition. In some embodiments, however, the coating system may include one or more intermediate layers between the undercoat composition and the overcoat composition. Likewise, in some embodiments, the coating system may include one or more topcoats overlying the overcoat composition.

In some embodiments, the invention provides a mono-coat coating system that exhibits, for example, suitable adhesion, flexibility, and corrosion resistance when applied to a metal substrate and cured to form a cured coating. In one such embodiment, the mono-coat coating system is formed by applying the overcoat composition of the present invention directly to a metal substrate, whereby the overcoat composition is cured to form an adherent mono-coat. In one such embodiment, the cured mono-coat coating system has a total dry film weight of about 10 to about 12 $g/m^2$. The mono-coat coating system is particularly well suited for use on food-contact surfaces of food and beverage containers (e.g., closures) for packaging food and beverage products with non-corrosive or minimally corrosive properties (e.g., marmalade).

In another aspect, the present invention provides a coating system consisting essentially of a layer of the undercoat composition or a layer of the overcoat composition.

As used herein in the context of a coating system consisting essentially of a layer, the term "consisting essentially of" refers to a coating system that does not include an epoxy-phenolic layer (especially an epoxy-phenolic layer formulated using BPA or oxirane-containing compounds such as aromatic glycidyl ether compounds) directly overlying or underlying the recited layer. In this context, unless specifically indicated otherwise, the coating system may include one or more layers in addition to the recited layer so long as the one or more layers are not an epoxy-phenolic layer directly overlying or underlying the recited layer. If specifically indicated, the term "consisting essentially of" as used in the above context may also refer to a coating system that does not include a dissimilar coating layer (e.g., a layer that does not include a thermoplastic dispersion) directly overlying or underlying the recited layer. Thus, for example, in an embodiment including a coating system consisting essentially of a layer of the overcoat composition, the coating system may include two or more layers of the overcoat composition. Furthermore, as used in the context of a coating system consisting essentially of a layer of a composition, the term "consisting essentially of" does not limit the components of the recited composition. Thus, for example, in a claim reciting a coating system consisting essentially of a layer of a composition comprising a thermoplastic polymer dispersed in a carrier, the composition of the layer may include any component in addition to the thermoplastic dispersion, regardless of whether the component may be considered to affect a basic and novel characteristic of the composition.

In some embodiments, the invention provides a coating system consisting essentially of a plurality (e.g., two or more, three or more, four or more, etc.) of layers, wherein each layer comprises an organosol layer (e.g., formed from any of the compositions described herein). As used in this context, the term "consisting essentially of" refers to a coating system that does not include an epoxy-phenolic layer (especially an epoxy-phenolic layer formulated using BPA or oxirane-containing compounds such as aromatic glycidyl ether compounds) directly overlying or underlying any of the recited organosol layers. As used in this context, the term "consisting essentially of" does not limit the components of the recited layer. If specifically indicated, the term as used in this context may also refer to a coating system that does not include a dissimilar coating layer (i.e., a non-organosol layer) directly overlying or underlying any of the recited organosol layers.

Thermoplastic dispersions for use in the present coating system can be prepared using any suitable method to preferably provide sufficient suspension and dispersion of the particles included therein. Examples of suitable process methods include solution blending, high-speed dispersion, high-speed milling, and the like. A substantially homogeneous dispersion of the particles throughout the liquid carrier typically indicates an adequate mixture or blend. The thermoplastic particles preferably remain substantially undissolved in the liquid carrier.

To prepare the coating systems of the present invention, in some embodiments, a thermoplastic dispersion is made in a first step (a dispersion phase) where the composition is thickened and has somewhat higher solids than the subsequent phase, often referred to as the "let down," where the components (e.g., addition of the stabilizer polymer) are stirred at a slower rate. Examples of suitable process methods to make the coating compositions of the present invention include admixture, blending, paddle stirring, etc.

Cured coating systems of the present invention preferably adhere well to metal (e.g., steel, tin-free steel (TFS), tin plate, electrolytic tin plate (ETP), aluminum, black plate, etc.) and preferably provide high levels of resistance to corrosion or degradation that may be caused by prolonged exposure to, for example, food or beverage products. The coatings may be applied to any suitable surface, including inside surfaces of containers, outside surfaces of containers, container ends, and combinations thereof.

Cured coating systems of the present invention are particularly well suited as adherent coatings for metal cans or containers, although many other types of articles can be coated. Examples of such articles include closures (including, e.g., food-contact surfaces of twist off caps for food and beverage containers); bottle crowns; two and three-piece cans (including, e.g., food and beverage containers); shallow drawn cans; deep drawn cans (including, e.g., multi-stage draw and redraw food cans); can ends; drums (including general packaging drums and drums for packaging food or beverage products); monobloc aerosol containers; and general industrial containers, cans (e.g., paint cans), and can ends.

As discussed previously, preferred coating systems of the present invention are particularly suited for use on food-contact surfaces of food or beverage containers. Preferably, the cured systems are retortable when employed in food and beverage container applications. Preferred cured coatings of the present invention can withstand elevated temperature conditions frequently associated with retort processes or other food or beverage preservation or sterilization processes. As discussed above, particularly preferred cured coating systems exhibit enhanced resistance to such conditions while in contact with food or beverage products that exhibit one or more aggressive (or corrosive) chemical properties under such conditions.

The coating system of the present invention can be applied to a substrate using any suitable procedure such as, for example, spray coating, roll coating, coil coating, curtain coating, immersion coating, meniscus coating, kiss coating, blade coating, knife coating, dip coating, slot coating, slide coating, and the like, as well as other types of premetered coating. In one embodiment where the coating is used to coat metal sheets or coils, the coating can be applied by roll coating.

The coating system can be applied to a substrate prior to, or after, forming the substrate into an article. For closures, the substrate is typically coated prior to forming the substrate into an article (although, if desired, the substrate can be coated after forming the substrate into a closure). Preferably, at least a portion of the substrate is coated with the coating system of the present invention, which is then at least partially cured before the substrate is formed into an article. In presently preferred embodiments, the following method is employed: (1) the undercoat composition is applied to at least a portion of the substrate, (2) the undercoat composition is then cured, (3) the overcoat composition is applied to the cured undercoat composition, and (4) the overcoat composition is then cured to produce a cured coating system. Alternatively, the method may include (a) applying the undercoat composition to at least a portion of the substrate, (b) drying the undercoat composition (which may result in at least partial crosslinking), (c) applying the overcoat composition to the undercoat composition (or to one or more optional intermediate layers applied to the undercoat composition), and (d) curing the coating system to produce a cured coating system.

In some embodiments, multiple layers of the overcoat and/or undercoat composition may be applied.

Coating systems of the present invention are preferably cured to form a hardened coating system. After applying the coating system onto a substrate, the coating compositions of the present invention can be cured using a variety of processes, including, for example, oven baking by either conventional or convectional methods, or any other method that provides an elevated temperature that preferably allows the thermoplastic material particles to fuse together. The curing process may be performed in either discrete or combined steps. For example, substrates can be dried at ambient temperature to leave the coating compositions in a largely uncrosslinked state. The coated substrates can then be heated to fully cure the compositions. In certain instances, coating compositions can be dried and cured in one step.

The curing process may be performed at temperatures in the range of about 177° C. to about 232° C., taking into account, however that the upper end of the temperature range can change depending on the decomposition temperature of the thermoplastic material. PVC, for example, begins to degrade at about 188° C., while other materials may degrade at higher or lower temperatures. In the situations where PVC is used and the substrate coated is in metal sheet form, curing can be performed at about 177° C. to about 205° C. for about 5 to about 15 minutes. Where the coating compositions are applied on metal coils, curing is typically conducted at temperatures of about 210° C. to about 232° C. for about 15 to 30 seconds.

A non-limiting example of a suitable coating system of the present invention is made as follows:

An organosol undercoat composition is prepared that contains a stabilized PVC dispersed in organic solvent, a polyester, and a crosslinker. In one such embodiment, a homogenous organosol undercoat composition is prepared that includes about 30 to about 50 parts of stabilized PVC, about 20 to about 30 parts of polyester, about 5 to about 15 parts of crosslinker (which preferably includes a phenolic crosslinker), and a sufficient amount of organic solvent to provide a coating composition having from about 40 to about 60 wt-% solids. The choice of the particular PVC, organic solvent, polyester, and crosslinker to use and in what specific amount may be determined based on the desired end use. In one embodiment, the crosslinker is a mixture of a phenolic crosslinker and a melamine crosslinker. In a presently preferred embodiment, the aforementioned organosol undercoat composition further includes about 25 to about 35 parts of titanium dioxide. If desired, 0 to 30 parts of other additives may be introduced, such as, for example, any of the ingredients described herein.

The undercoat organosol composition is applied by roll coating to a metal substrate such as tin plate, tin-free steel, or aluminum in an amount sufficient to obtain a coating have a film weight of about 6 to 12 g/m$^2$ (and preferably 7 to 9 g/m$^2$) after curing. To achieve suitable curing, the coated substrate is heated in an oven for about 10 minutes until a peak metal temperature ("PMT") of about 200° C. is reached.

An organosol overcoat composition is prepared and applied to the previously applied organosol undercoat composition. The organosol overcoat composition contains a stabilized PVC dispersed in organic solvent, a polyester, and a crosslinker. In one such embodiment, a homogenous undercoat organosol composition is prepared that includes about 30 to about 50 parts of stabilized PVC, about 20 to about 30 parts of polyester, about 2 to about 10 parts of crosslinker (which preferably includes a phenolic crosslinker), and a sufficient amount of organic solvent to provide a coating composition having from about 40 to about 60 wt-% solids. The choice of particular PVC, organic solvent, polyester, and crosslinker to use and in what specific amount may be determined based on the desired end use. In one embodiment, the crosslinker is a mixture of a phenolic crosslinker and a melamine crosslinker. In a presently preferred embodiment, the aforementioned organosol overcoat composition further includes about 25 to about 35 parts of titanium dioxide. Preferably, the organosol overcoat composition includes at least about 15 parts (and more preferably about 15 to about 45 parts—including any polyester(s) capable of functioning as a stabilizer) of a stabilizer. If desired, 0 to 30 parts of other additives may be introduced, such as, for example, any of the ingredients described herein.

The organosol overcoat composition is applied to the previously applied organosol undercoat composition by roll coating in an amount sufficient to obtain a cured coating system having a total film weight of about 18 to about 20 g/m$^2$ after curing. The coated substrate is heated in an oven for about 6 to 10 minutes until a PMT of about 200° C. is reached. A hardened multi-coat coating system is thus obtained. The coated substrate is then fabricated into a closure or other packaging article. For closures, a closure compound may be applied to the coating system. Typically the closure compound is applied to the coating system after forming the coated substrate into a closure. For food or beverage cans (e.g., three-piece food cans for frozen juice concentrate), a gasket may be applied to the coating system.

The following test methods may be utilized to assess the performance properties of cured coating systems of the invention.

I. Corrosion Resistance Test

A test useful for assessing the corrosion resistance of a cured coating system is provided below. The test (referred to herein as the "Corrosion Resistance Test") may be useful for simulating the ability of a cured coating system to withstand prolonged exposure to products such as, for example, food or beverage products having one or more corrosive properties.

ETP sheet substrate is coated with a sufficient amount of coating composition such that, when the coating composition is cured, a cured coating having a dry film weight of about 15 g/m$^2$ is produced. (The curing conditions may vary depending upon the coating system, but, for example, for purposes of evaluating multilayer coating compositions of the present invention the following conditions may be used: (1) an amount of undercoat composition sufficient to yield a dry film weight of 10 g/m$^2$ is applied to the ETP and the coated ETP is cured in an oven for about 10 minutes until a PMT of about 190° C. is obtained and then (2) an amount of overcoat composition sufficient to yield a dry film weight of 5 g/m$^2$ is applied to the undercoat composition and the coated ETP is again cured in an oven for about 10 minutes until a PMT of about 190° C. is obtained.) Within 1 day of coating the ETP substrate, the coated ETP substrate is fabricated into a diameter 62 industrial cap, whereby the coating is located on the interior surface of the cap. The profile of the diameter 62 cap is preferably relatively gentle (i.e., the cap does not have a severe contour profile). Within 1 day of forming the cap, 0.5 milliliters ("ml") of a conventional liquid plastisol closure compound (i.e., a type of closure compound typically used to seal closures to glass jars) is applied to a portion of the coating where a closure compound is typically applied for closure applications. The cap is rotated quickly so that the closure compound is applied about one-third of the way around the circumference of the cap, thereby covering about one-third of the area that a closure compound would typically cover.

Within 1 day of application, the closure compound is cured at a temperature and time typically employed for the type of closure compound employed. (For example, for some closure compounds appropriate curing conditions may include placing the cap in a 200° C. oven for 2 minutes. For other closure compounds, a temperature of 210° C. or 220° C. may be more appropriate for a longer or shorter duration than 2 minutes.) A 200 ml glass jar with a threaded opening compatible with a diameter 62 cap is filled with 180 ml of a simulant solution that includes 4.5 w/w % NaCl and 4.5 w/w % acetic acid (the balance being distilled water). The cap is threaded onto the filled jar and screwed tight by hand. The filled jar is placed upright in a 40° C. oven for a specified test period (e.g., 1 week, 2 weeks, 3 weeks, 4 weeks, etc.). After expiration of the test period, the interior surface of the cap is visually examined for defects, without the use of magnification. For a cured coating to pass the Corrosion Resistance Test, (i) no blistering should be present on the coated interior flat surface of the cap and (ii) the closure compound should not exhibit any corrosion color (as evidenced, for example, by the appearance of rust).

Preferred coating systems of the present invention are capable of passing the above Corrosion Resistance Test after being exposed to the simulant solution for a test period of 1 week, 2 weeks, 3 weeks, and 4 or more weeks.

II. Adhesion Test

A useful test for assessing whether coating compositions adhere well to a substrate is the ASTM D 3359—Test Method B, performed using SCOTCH 610 tape, available from 3M Company of Saint Paul, Minn. (referred to herein as the "Adhesion Test"). Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Preferred cured coating systems of the present invention (before retort) exhibit an adhesion on the above scale of at least about 8, more preferably at least about 9, and even more preferably 10.

To assess the ability of cured coating systems to exhibit good adhesion after being subjected to sterilization or retort processes frequently employed in the packaging of food or beverage products, the below "retort" method may be useful: ETP sheet substrate, having a coating to be tested cured thereon, is partially immersed in a vessel filled with water. The vessel is placed in an autoclave and for 1 hour is subjected to a temperature of about 130° C. and a pressure of about 1.7 Bar in the presence of steam. After being retorted under these conditions, preferred cured coating systems of the present invention, when subjected to the Adhesion Test, exhibit an adhesion of at least about 8, more preferably at least about 9, and even more preferably 10.

Additional non-limiting embodiments of the invention are provided below.

Embodiment A. A coated article, comprising: (i) a container, or a portion thereof, comprising a metal substrate and (ii) a multi-coat coating system applied to at least a portion of the metal substrate, the coating system comprising an overcoat composition comprising an overcoat thermoplastic polymer dispersed in an overcoat carrier and an undercoat composition applied to the metal substrate comprising an undercoat thermoplastic polymer dispersed in an undercoat carrier.

Embodiment B. A coated article, comprising: a food or beverage container, or a portion thereof, comprising: (i) a metal substrate and (ii) a mono-coat or multi-coat coating system applied to at least a portion of the metal substrate, the coating system consisting essentially of a layer of a composition comprising a thermoplastic polymer dispersed in a carrier; wherein the coating system is substantially free of mobile BPA and aromatic glycidyl ether compounds.

Embodiment C. A coating system, comprising: (i) an overcoat composition comprising a thermoplastic polymer dispersed in an overcoat carrier liquid and (ii) an undercoat composition comprising a poly(vinyl chloride) polymer dispersed in an undercoat carrier liquid, a stabilizer, and a crosslinker; wherein the coating system comprises a hardenable coating system that is substantially free of mobile BPA and aromatic glycidyl ether compounds Embodiment D. A method comprising: (i) applying an undercoat composition to at least a portion of a metal substrate prior to or after forming the metal substrate into a container or portion thereof, the undercoat composition comprising a poly(vinyl chloride) polymer dispersed in an undercoat carrier liquid, a stabilizer, and a crosslinker; (ii) drying and at least partially curing the undercoat composition and then applying an overcoat composition to the coated metal substrate, the overcoat composition comprising a thermoplastic polymer dispersed in an overcoat carrier; and (iii) curing the overcoat composition to produce a cured coating system adhered to the metal substrate.

Sub-Embodiment 1. Any of Embodiments A-D, wherein the coating system is substantially free, essentially free, essentially completely free, or completely free of mobile BPA and aromatic diglycidyl ether compounds.

Sub-Embodiment 2. Any of Embodiments A-D, wherein the coating system is substantially free, essentially free, essentially completely free, or completely free of bound BPA and aromatic diglycidyl ether compounds.

Sub-Embodiment 3. Any of Embodiments A-D or Sub-Embodiments 1-2, wherein the coating system is substantially free, essentially free, essentially completely free, or completely free of mobile oxirane-containing compounds.

Sub-Embodiment 4. Any of Embodiments A-D or Sub-Embodiments 1-2, wherein the coating system is substantially free, essentially free, essentially completely free, or completely free of bound oxirane-containing compounds.

Sub-Embodiment 5. Any of Embodiments A-D, wherein the thermoplastic polymer or poly(vinyl chloride) polymer of the undercoat composition comprises thermoplastic particles or poly(vinyl chloride) particles having an average particle size of about 0.1 to about 30 microns.

Sub-Embodiment 6. A coated article of Sub-Embodiment 5, wherein the poly(vinyl chloride) polymer is present in an amount from about 10 to about 60 wt-%, based on the total nonvolatile weight of the undercoat composition.

Sub-Embodiment 7. A coated article of Embodiment A, wherein the overcoat composition further comprises a polyester polymer.

Sub-Embodiment 8. A coated article of Embodiment A, wherein the overcoat composition further comprises a crosslinker.

Sub-Embodiment 9. A coated article of Embodiment B, wherein the coating system is a mono-coat coating system.

Sub-Embodiment 10. A coated article of Embodiment B, wherein the composition comprises: from about 10 to about 60 wt-% of the thermoplastic polymer, based on the nonvolatile weight of the undercoat composition; from about 10 to about 40 wt-% of a polyester polymer, based on the nonvolatile weight of the undercoat composition; and from about 1 to about 25 wt-% of a crosslinker, based on the nonvolatile weight of the undercoat composition.

Sub-Embodiment 11. A coating system of Embodiment C, wherein the undercoat composition comprises from about 10 to about 60 wt-% t of poly(vinyl chloride) polymer, at least about 5 wt-% t of stabilizer, and at least about 1 wt-% of crosslinker.

Sub-Embodiment 12. A method of Embodiment D, further comprising: applying a closure compound or gasket to the overcoat composition.

Sub-Embodiment 13. A method of Embodiment D, wherein the container comprises a food or beverage container.

Sub-Embodiment 14. A coated articled of Embodiment A or B, wherein the cured coating system has a dry film weight of about 5 to about 40 g/m$^2$.

The complete disclosure of all patents, patent applications, publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A coated article, comprising:

a twist off cap or lid closure for use in sealing a food or beverage container, comprising:

a metal substrate;

a multi-coat coating formed from a coating system applied to at least a portion of the metal substrate, the coating system comprising:

an overcoat layer formed from an overcoat composition comprising more than 10 wt-% of a polyester polymer, based on the total nonvolatile weight of the overcoat composition, and thermoplastic halogenated polyolefin polymer particles dispersed in an overcoat carrier; and an undercoat layer formed from an undercoat composition applied to the metal substrate comprising thermoplastic halogenated polyolefin polymer particles dispersed in an undercoat carrier; and wherein the coating system is substantially free of bound BPA; and a closure compound applied to the multi-coat coating.

2. The coated article of claim 1, wherein the coating system is substantially free of oxirane-containing compounds.

3. The coated article of claim 1, wherein the thermoplastic halogenated polyolefin polymer particles include poly(vinyl chloride).

4. The coated article of claim 3, wherein the poly(vinyl chloride) is present in an amount from about 10 to about 60 wt-%, based on the total nonvolatile weight of the undercoat composition.

5. The coated article of claim 3, wherein the poly(vinyl chloride) polymer of the undercoat composition has a number average molecular weight ($M_n$) of about 50,000 to about 300,000.

6. The coated article of claim 1, wherein the undercoat composition further comprises a crosslinker.

7. The coated article of claim 1, wherein the undercoat composition comprises:

from about 10 to about 60 wt-% of the thermoplastic halogenated polyolefin polymer particles, based on the total nonvolatile weight of the undercoat composition;

from about 10 to about 40 wt-% a polyester polymer, based on the total nonvolatile weight of the undercoat composition; and from about 1 to about 30 wt-% of a crosslinker, based on the total nonvolatile weight of the undercoat composition.

8. The coated article of claim 1, wherein the undercoat composition comprises:

from about 10 to about 60 wt-% of thermoplastic poly (vinyl chloride) polymer particles;

at least about 5 wt-% of stabilizer; and at least about 1 wt-% of crosslinker.

9. The coated article of claim 1, wherein the overcoat thermoplastic polymer comprises a poly(vinyl chloride) polymer.

10. The coated article of claim 1, wherein the overcoat composition comprises:

from about 10 to about 60 wt-% of the halogenated polyolefin polymer particles, based on the nonvolatile weight of the overcoat composition; and from more than 10 to about 40 wt-% of the polyester polymer, based on the nonvolatile weight of the overcoat composition;

from about 1 to about 25 wt-% of a crosslinker, based on the nonvolatile weight of the undercoat composition.

11. The coated article of claim 1, wherein the undercoat composition includes at least 30 wt-% of the thermoplastic halogenated particles, based on the total nonvolatile weight of the undercoat composition.

12. The coated article of claim 1, wherein the overcoat composition includes at least 20% by weight of a polyester polymer, based on the total nonvolatile weight of the overcoat composition.

13. The coated article of claim 1, wherein the coating system is substantially free of mobile and bound epoxidized oils and the thermoplastic halogenated polyolefin polymer particles have an average particle size of about 0.1 to about 30 microns.

14. The coated article of claim 1 further comprising a food or beverage container sealed with the twist off cap or lid closure and having a packaged food or beverage product contained therein.

15. A coating system, comprising:

an overcoat composition comprising more than 10% by weight of a polyester polymer, based on the total nonvolatile weight of the overcoat composition, and thermoplastic halogenated polyolefin particles dispersed in an overcoat carrier liquid; and an undercoat composition comprising:

at least 30 wt-% of halogenated thermoplastic poly(vinyl chloride) polymer particles dispersed in an undercoat carrier liquid;

at least 5 wt-% of a stabilizer;

at least 1 wt-% of a crosslinker; and less than 40 wt-%, if any, of a polyester polymer;

wherein the above weight percentages are based on the total nonvolatile weight of the undercoat composition, and wherein the coating system comprises a hardenable coating system that is substantially free of bound BPA and oxirane-containing compounds; and a closure compound.

16. The coating system of claim 15, wherein when the coating system is tested pursuant to the Corrosion Resistance Test described herein using a 1 week immersion test period in a 40° C. simulant solution of 4.5 w/w % NaCl and 4.5 w/w % acetic acid, the coating system passes the Corrosion Resistance Test.

17. The coating composition of claim 15, wherein the overcoat composition includes at least 15% by weight of a polyester polymer, based on the total nonvolatile weight of the overcoat composition.

18. A method comprising:

applying an undercoat composition to at least a portion of a metal substrate, the undercoat composition comprising:

from 10 to 60 wt-% of thermoplastic halogenated polyolefin polymer particles dispersed in an undercoat carrier liquid, based on the total nonvolatile weight of undercoat composition, a stabilizer, a crosslinker, and less than 40 wt-%, if any, of a polyester polymer, based on the total nonvolatile weight of the undercoat composition;

drying and at least partially curing the undercoat composition and then applying an overcoat composition to the coated metal substrate, the overcoat composition comprising more than 10% by weight of a polyester polymer, based on the total nonvolatile weight of the overcoat composition, and halogenated thermoplastic polyolefin particles dispersed in an overcoat carrier;

curing the overcoat composition to produce a cured coating system adhered to the metal substrate;

forming a closure, for use in sealing a food or beverage container, from the coated metal substrate including the cured coating system; and applying a closure compound to the cured coating system of the closure.

19. The method of claim 18, wherein the overcoat composition includes at least 15% by weight of a polyester polymer, based on the total nonvolatile weight of the overcoat composition.

* * * * *